(12) United States Patent
Sudderth et al.

(10) Patent No.: US 7,025,899 B2
(45) Date of Patent: Apr. 11, 2006

(54) CONCENTRATED SOLUTIONS OF OXIME METAL EXTRACTANTS AND METHOD OF FORMULATING EXTRACTANT COMPOSITIONS THEREFROM

(75) Inventors: R. Brantley Sudderth, Tucson, AZ (US); George A. Wolfe, Tucson, AZ (US); Ralph L. Jensen, Tucson, AZ (US); Gary A. Kordosky, Tucson, AZ (US); Michael J. Virnig, Tucson, AZ (US); Mary Collins, Cork (IE); Stephen M. Olafson, Tucson, AZ (US); Terry L. Crandell, Tucson, AZ (US); Hans C. Hein, Santiago (CL)

(73) Assignee: Cognis Corporation, Cincinnati, OH (US)

( * ) Notice: Subject to any disclaimer, the term of this patent is extended or adjusted under 35 U.S.C. 154(b) by 772 days.

(21) Appl. No.: 10/029,612

(22) Filed: Dec. 21, 2001

(65) Prior Publication Data

US 2002/0157572 A1    Oct. 31, 2002

Related U.S. Application Data

(63) Continuation-in-part of application No. 08/953,273, filed on Oct. 17, 1997, now abandoned.

(60) Provisional application No. 60/029,298, filed on Oct. 21, 1996.

(51) Int. Cl.
| | |
|---|---|
| C09K 3/00 | (2006.01) |
| C01B 31/16 | (2006.01) |
| B01D 11/04 | (2006.01) |
| C02F 1/26 | (2006.01) |

(52) U.S. Cl. .................... 252/184; 106/311; 210/634; 210/688; 423/24; 423/63; 423/70; 423/21.5; 423/8

(58) Field of Classification Search ............... 423/24, 423/63, 70, 21.5, 8, 139, 112; 252/184; 106/311; 210/634, 688

See application file for complete search history.

(56) References Cited

U.S. PATENT DOCUMENTS

| 3,224,873 A | * | 12/1965 | Swanson | 75/718 |
|---|---|---|---|---|
| 3,428,449 A | * | 2/1969 | Swanson | 423/24 |
| 3,616,426 A | * | 10/1971 | Nakao et al. | 204/207 |
| 3,925,472 A | * | 12/1975 | Swanson | 564/266 |
| 3,952,775 A | * | 4/1976 | Ogata | 137/625.38 |
| 4,020,105 A | * | 4/1977 | Ackerley et al. | 564/265 |
| 4,020,106 A | * | 4/1977 | Ackerley et al. | 564/265 |
| 4,029,704 A | * | 6/1977 | Anderson | 564/329 |
| 4,085,146 A | * | 4/1978 | Beswick | 568/436 |
| 4,173,616 A | * | 11/1979 | Koenders et al. | 423/24 |
| 4,350,667 A | * | 9/1982 | Andersson et al. | 423/24 |
| 4,500,494 A | * | 2/1985 | Scher | 423/24 |
| 4,507,268 A | * | 3/1985 | Kordosky et al. | 423/24 |
| 4,544,532 A | * | 10/1985 | Kordosky et al. | 423/24 |
| 4,563,213 A | * | 1/1986 | Hubred | 423/139 |
| 4,702,838 A | * | 10/1987 | Babcock et al. | 210/638 |
| 5,039,497 A | * | 8/1991 | Weber et al. | 423/24 |
| 5,281,336 A | * | 1/1994 | Dalton et al. | 210/634 |
| 5,788,822 A | * | 8/1998 | Martyak et al. | 205/313 |
| 6,156,280 A | * | 12/2000 | Virnig et al. | 423/49 |

* cited by examiner

*Primary Examiner*—Joseph D. Anthony
(74) *Attorney, Agent, or Firm*—John E. Daniels; Daniel S. Ortiz

(57) ABSTRACT

The preparation of concentrated solutions of oxime metal extractants, such as aldoximes and ketoximes, or mixtures of aldoxime and ketoxime, and the use thereof in formulating or preparing extraction reagent compositions for use in an extractant organic phase in a process of extracting metals from aqueous solutions containing metal values; and in particular, to concentrates which are solutions of individual ketoxime or aldoxime or mixtures of water-insoluble hydroxy aldoximes and ketoximes, in varying ratios by weight of 1:100 aldoxime to ketoxime, or conversely, 100:1 ketoxime to aldoxime, in water-immiscible hydrocarbon solvents or equilibrium modifiers. The invention also provides for maintaining stability of concentrates determined by accelerating rate calorimetry to define the ranges of oxime concentration and volume whereby the concentrate will be a stable, flowable, pourable and pumpable concentrate which can be safely stored long term. The extraction compositions may also optionally contain equilibrium modifiers or kinetic additives.

9 Claims, No Drawings

CONCENTRATED SOLUTIONS OF OXIME METAL EXTRACTANTS AND METHOD OF FORMULATING EXTRACTANT COMPOSITIONS THEREFROM

CROSS-REFERENCE TO RELATED APPLICATIONS

This application is a continuation-in-part application of U.S. application Ser. No. 08/953,273 filed Oct. 17, 1997), the disclosure of which is hereby incorporated by reference and the priority of which is claimed, which application is in turn a claimed priority of U.S. provisional application Ser. No. 60/029,298 filed Oct. 21, 1996, the disclosure of which was incorporated by reference and the priority of which was claimed.

BACKGROUND OF THE INVENTION

1. Field of the Invention

This invention relates to the preparation of stable concentrated solutions of oxime metal extractants such as aldoximes and ketoximes for supplying metal extraction system operators. More specifically it relates to stable concentrates of hydroxy aryl oxime metal extractant reagent compositions, either individual ketoximes or aldoximes or mixtures thereof in varying ratios by weight of 1:100 to 100:1 aldoximes to ketoxime. The concentrates are solutions of the individual hydroxy aryl oxime either individually ketoxime or aldoxime, or mixtures thereof in a water immiscible hydrocarbon solvent, such as kerosene, or modifiers, or mixtures thereof. The concentrates are flowable, pourable, pumpable and maintain their stability in shipping to the extraction plant sites and in storage.

As is well known to those skilled in the art in relation to extraction systems operations, as exemplified in U.S. Pat. No. 4,582,689 and 4,507,268, the starting material for large scale solvent extraction processing of copper is an aqueous solution generally obtained by leaching a body of ore, which contains a mixture of metals including copper. The leaching medium dissolves salts of copper and other metals as it trickles through the ore to provide an aqueous solution of the mixture of metal values. The metal values are usually leached with a sulfuric acid medium providing an aqueous acidic solution, but the ore may sometimes be leached with an aqueous ammoniacal solution to provide a leach liquor of a basic aqueous solution.

In the extraction system operation the aqueous solution is mixed in a large mixer tank with an extraction reagent which is dissolved in a water immiscible organic hydrocarbon solvent, such as kerosene to give a dilute solution containing about 5% by weight to about 40% by weight of the extractant reagent to give an organic phase suitable for use in a solvent extraction process. The reagent includes an extractant chemical insoluble in water and soluble in the organic solvent, which selectively forms a metal-extractant complex with the copper ions in preference to other ions of other metals. The step of forming the complex is called the extraction or loading stage of the solvent extraction process.

The outlet of the mixer continuously feeds in a continuous process to a large settling tank. While reference is made to a continuous process, the operation may be carried out in a batch basis, if desired. In the large settling tank, the organic phase now containing the copper-extractant complex in solution is separated from the copper-depleted aqueous solution (raffinate phase). This part of the process is called the phase separation. Usually the process of extraction is repeated through two or more mixer settler stages in order to more completely extract the desired metal.

Where two or more mixer-settler stages are employed for extraction, countercurrent flow of the feedstock aqueous solution and the organic phase or reagent solution is employed. In a typical 3-stage extraction system, for example, the feedstock will flow through an initial mixer-settler (E-1), subsequently though a second stage (E-2) and then through a final mixer-settler stage (E-3). As a result, by the time the feedstock reaches mixer-settler stage E-3, much of the extractant will be in the form of a copper extractant complex and the organic phase will be contacting the feedstock solution when it is in condition wherein little, if any of the dissolved copper remains therein.

After extraction, the depleted aqueous feedstock (raffinate) is either discharged or recirculated to the ore body for further leaching. The loaded organic phase containing the dissolved copper-extractant complex is fed to another set of mixer-settler tanks, where it is mixed with an aqueous strip solution, such as highly acidic sulfuric acid solution. The highly acidic strip solution breaks apart the copper-extractant complex and permits the purified and concentrated copper to pass to the aqueous strip solution. As in the extraction process described above, the mixture is fed to another mixer-settler tank for phase separation. This process of breaking the copper-extractant complex is called the stripping stage, and the stripping operation is repeated through two or more mixer-settler stages to more completely strip the copper from the organic phase.

From the stripping settler tank, the regenerated stripped organic phase is recycled to the extraction mixers to begin extraction again, and the strip aqueous phase is customarily fed to an electrowinning tankhouse, where the copper metal values are deposited on plates by a process of electrodeposition. After electrowinning of the copper values from the aqueous strip solution, the solution known as spent electrolyte is returned to the stripping mixers to begin stripping again.

As is apparent, the extraction process operations requires large volumes of extraction reagent and aqueous leach and stripping solutions. In commercial operations, the mixer/settler tanks are large tanks. One such mixer tank in a commercial operation employs a tank on the order of about 28 meters by 28 meters (or about 92 feet long and 92 feet wide). With an organic phase extractant level of about one foot deep, the total volume of organic phase contained in the mixer/settler tank thereof would be about 8464 cubic feet, which converted to liters would be a volume greater than 200,000 liters. Modern solvent extraction plants typically consist of two stages of extraction, 1 stage of stripping, and an organic phase surge tank which will contain as a minimum at least the volume of organic contained in one mixer/settler tank. This corresponds to a total organic phase volume of 800,000 liters. At typical extraction reagent concentrations of 15% by volume in the organic phase, one would have to handle 600 drums of reagent as previously supplied, to fill the system. In the prior supply of phenolic oximes to extraction systems operations in a copper recovery process by solvent (SX) processes, from leaching solutions at copper mines or from waste metal treatment solutions, the phenolic oxime extractants in hydrocarbon solvent solutions were supplied to the operations in conventional 200 liter drum containers at approximately 1.5 to 1.8 molar (an oxime content by weight of about 48–61% depending on the particular oxime and its molecular weight). For a ketoxime, such as 2-hydroxy-5-nonyl acetophenoxime, the oxime content by weight is about 48%. For the 5-nonyl salicylaldoxime the oxime content is about 51% by weight and for the 5-dodecyl salicylaldoxime the oxime content is about 61%.

As is apparent, in view of the large volume employed in the extraction systems operations, this required a large number of 200 liter drum containers with attendant problems of logistics, handling and worker exposure.

It is also known that these same oxime compounds, when present at or near 100% solids, present both logistic and health hazard problems as follows:

(a) first, at 100% solids these compounds are extremely viscous, such that they will not pour or are not pumpable at ambient temperatures. Heat is then required to remove the material from its container, whether that container be a small bottle, a drum, or a large storage tank. Dilution with a hydrocarbon solvent will diminish the viscosity problem.

(b) Second, when heat is applied to these compounds, it can trigger an exothermic autocatalytic decomposition process which can result in pressure buildup in a sealed vessel and potential rupture of the vessel. Surprisingly, the sensitivity of these materials to heat is highly dependent upon their concentration in the hydrocarbon solvent/modifier and the total volume of mass in the storage container.

(c) Third, small 200 liter drum containers do not represent as great a problem with regard to the decomposition. Because of their small volume, the heat generated in the center of a small container, such as a drum, has a short distance to travel through the surrounding liquid to reach a surface, where radiation can occur so as to cool the contents of the drum preventing heating of the drum's contents to the point where a run-away degradation occurs. However in large volume containers, such as the 1 cubic meter (1000 liters) volume in a liquid insulated bulk container (LIBC) or an "isotainer"(20,000 liters), there is reduced overall surface area to volume ratio of the container, so that heat generated by the concentrate therein is not so readily dissipated as in the smaller 200 liter drum container and the temperature of the material can easily reach the point that the rate at which heat is generated by the decomposition reaction exceeds the ability of the system to cool itself by radiating heat to the environment resulting in a rapid increase in the rate of the decomposition reaction and resulting in a run-away reaction. This temperature is dependent on the concentration of the material and the size of the storage vessel. It is referred to as the temperature of no return.

SUMMARY OF THE INVENTION

It has now been found that concentrates of hydroxy aryl oximes may be prepared at higher concentrations than have heretofore been provided, which overcome the problems noted above and which provide for ease in formulating extraction compositions for use in processes of extracting metals from aqueous solutions containing the desired metal values. Thus the concentrates of the present invention at much higher active solids than those in the past can be prepared and still maintain the logistic and hazard integrity of the products. In addition to minimizing any decomposition-related problems, the concentrates are pourable and pumpable, stable concentrates, and at ambient temperatures will flow from the containers storing the concentrates which empty virtually completely, with no, or little, concentrate clinging to the sides of the container, thereby avoiding any loss of extractant.

The present invention thereby provides concentrates of hydroxy aryl oxime metal extractants, either ketoxime or aldoxime, in a stable, flowable, pourable and pumpable form at concentrations in water immiscible hydrocarbon solvents or diluents usually employed in the processes for extraction of metals such as copper, zinc or nickel. The concentrates will have a concentration of oxime in the water immiscible solvent in excess of 55%, more desirably in excess of 62% and preferably in excess of 68% by weight. The concentrates are useful in easily formulating extraction compositions which comprise a mixture of oximes, either ketoxime or aldoxime mixtures, or mixtures of ketoxime and aldoxime as described in U.S. Pat. No. 4,507,268. The concentrates are particularly useful for easily formulating mixtures which may contain ratios by weight of aldoxime to ketoxime up to 100:1 to about 1:100 parts by weight in any desirable ratio at increments of 1% to provide the most desirable extraction composition for the particular metal and aqueous solution from which the metal is to be extracted. The concentrates are also useful for addition to the organic extractant phase of a metal extraction system, to adjust the extractant phase composition for optimum extraction efficiency and recovery of the extracted metal.

The invention accordingly relates not only to concentrates of the individual ketoximes or aldoximes, but also to concentrates of the mixture of ketoxime and aldoxime. The concentrates of the individual components, or of the mixture of individual components, offer the same advantages to the customer in terms of handling, particularly in large volume levels, providing a further advantage of being able to mix at the extraction system site to give the optimum blend of ketoxime and aldoxime to best optimize copper recovery from the current available leach liquors. Thus, the invention involves not only blending of the individual aldoxime and ketoxime to provide a concentrate of the mixture of aldoxime and ketoxime, but also involves the addition of the individual ketoxime or aldoxime concentrates, or concentrate of the mixture of ketoxime and aldoxime to the organic phase already containing a mixture of aldoximes and ketoximes as the organic extractant phase of a metal extraction system, thereby permitting an easy, practical and convenient means of adjusting the concentration of oxime extractants in the organic extractant phase of the system to any desirable ratios of aldoxime and ketoxime. Thus the blending operation does not necessarily require the blending of two individual concentrates together prior to adding it to the circuit organic phase, but also encompasses blending a concentrate with the circuit organic phase in the system.

In addition to the blending of the concentrates or addition thereof to the circuit organic phase of the extraction system, the invention also encompasses the blending of the oxime concentrates with conventional equilibrium modifiers or kinetic additives, prior to adding it to the circuit or the blending of the concentrate, either individual component, or concentrate of the mixture of aldoxime and ketoxime, followed by addition of the modifier and/or kinetic additive.

The hydroxy aryl oximes employed in the present invention are those ketoximes and aldoximes, which are alkyl-substituted on the aryl group, in which the alkyl group substituents contain preferably from about 7 to about 12 carbon atoms, the oximes being more fully defined hereinafter.

Due to the differences in molecular weights of the alkyl-substituted hydroxy aryl oximes, the amount by weight in the concentrate will vary with the hydroxy alkyl-substituted aryl oxime in which the alkyl groups have from about 7–9 carbon atoms which will have a lower concentration by weight level in the concentrate of about 55% by weight, more desirably above about 61% by weight, in the water-immiscible hydrocarbon solvent. In contrast the oximes in which the alkyl group having about 12 carbon atoms, will generally have a higher lower concentrate level by weight of about 62%, and preferably above 68% by weight concentration in the water-immiscible hydrocarbon solvent.

In either case, the upper concentration limit by weight may be up to about 75% by weight, more desirably up to about 80%, with 85% levels possible depending on the particular oxime employed and the total volume of the solution in the water-immiscible hydrocarbon solvent.

In general, the invention is broadly directed to concentrates of hydroxy aryl oximes in a water-immiscible hydrocarbon solvent, preferably a kerosene, comprising from 55%, but more preferably in excess of about 61% by weight of the hydroxy aryl oxime in the water-immiscible hydrocarbon solvent. The hydroxyaryl oxime may be either a ketoxime or an aldoxime.

As an individual ketoxime concentrate of the present invention, the concentrate will contain from 55% by weight, more desirably in excess of 61% by weight up to about 85% by weight.

As an individual aldoxime concentrate of the present invention, the concentrate will contain from 55% by weight in the water-immiscible hydrocarbon solvent, more desirably in excess of 61% by weight, i.e. from 62%, up to about 85% by weight in the water-immiscible hydrocarbon solvent. With a heptyl to nonyl aryl-substituted aldoxime, the lower levels, below 62%, may be employed, while with dodecyl aryl-substituted aldoximes, higher levels above 62% or 68% may be employed due to a difference in molecular weight over the nonyl products.

The individual concentrate components of the ketoxime and aldoxime defined above may be mixed to provide a concentrate of the mixture of aldoxime and ketoxime in a weight ratio of the oximes as predetermined to be the desired extraction reagent to be employed in the extraction system.

Thus, the present invention provides not only for the preparation of individual concentrate components of ketoxime and aldoxime, but also provides for the easy preparation of a concentrate of the mixture of aldoxime and ketoxime in various ratios by weight of aldoxime to ketoxime, as desired, from a ratio of about 100:1 to about 1:100, and more desirably in a ratio of about 10:1 to about 1:10.

As earlier indicated, the individual concentrate components of ketoxime or aldoxime, or the mixture of the individual concentrates may then be employed for addition in an extraction system circuit which comprises the contacting of an aqueous solution containing the desired metal to be recovered by contacting the aqueous solution with an oxime extractant reagent dissolved in a water-immiscible hydrocarbon solvent, thereby extracting the metal values from the aqueous solution into the organic phase of the extraction reagent dissolved in the water-immiscible hydrocarbon solvent from which the metal may be subsequently recovered. By the addition of the concentrates to the organic phase of the extraction system, the extractant reagent composition is thus adjusted to provide for the optimum blend of aldoxime and ketoxime for optimum extraction and recovery of the metal from the aqueous solutions containing the metal values such as the typical leach liquors currently available.

The invention also provides for a process of adjusting the extractant reagent composition in an existing extraction-system organic phase, by addition of an individual hydroxy aryl oxime concentrate, either ketoxime or aldoxime, or a concentrate comprised of a mixture of aldoxime and ketoxime, to the extractant organic phase of a metal extraction system wherein an aqueous solution containing metal values desired to be extracted is contacted with an extractant reagent composition comprised of an oxime extractant dissolved in a water-immiscible hydrocarbon solvent for a time sufficient to extract at least a portion of the metal values from the aqueous solution, the addition of the concentrate being added in an amount to provide the desirable ratio by weight of aldoxime and ketoxime in the extractant reagent composition and in a concentration to provide for optimum extraction of the metal values and optimum recovery of the metal from the aqueous solution.

DETAILED DESCRIPTION OF THE INVENTION

Other than in the operating examples, or where otherwise indicated, all numbers expressing quantities of ingredients or reaction conditions used herein are to be understood as modified in all instances by the term "about".

In view of the foregoing general Summary of the Invention, more specifically the present invention in detail relates to a process of preparing a stable, flowable, pumpable, and pourable concentrate of a hydroxyl aryl oxime metal extractant in a water-immiscible hydrocarbon solvent solution wherein the hydroxyl aryl oxime metal extractant therein has an oxime concentration of about 55–85% by weight, and more preferably about 62 to about 85% by weight, said process comprising confining said concentrate in a single container having a volume of from about 250 liters up to about 50,000 liters thereby maintaining the concentrate in an acceptable stability range as determined by accelerating rate calorimetry and thereby providing a stable, flowable, pourable, and pumpable concentrate. The hydroxy aryl oxime employed in the process is one selected from the group consisting of (a) a ketoxime of the formula I or II, and (b) an aldoxime of formula III, as setout herein below.

The invention further relates to a stable, pumpable, flowable, and pourable concentrate of a hydroxyl aryl oxime metal extractant in a water-immiscible hydrocarbon solvent solution wherein the hydroxy aryl oxime metal extractant therein has an oxime concentration of about 55–85% by weight, preferably from about 62 to 85% by weight, confined in a single container having a volume of from about 250 liters up to about 50,000 liters, thereby maintaining the stability of the concentrate as determined by accelerating rate calorimetry and thereby providing a stable, pourable, pumpable and flowable concentrate. More specifically the hydroxyl aryl oxime is selected from the group consisting of
(a) a ketoxime of the formula I or II,

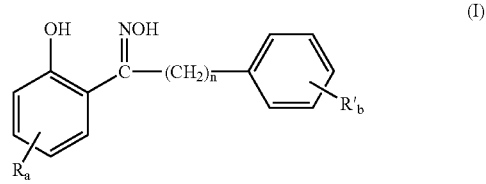

in which R and R' may be individually alike or different and are saturated aliphatic groups of 1–25 carbon atoms, ethylenically unsaturated aliphatic groups of 3–25 carbon atoms, or —OR" where R" is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25;

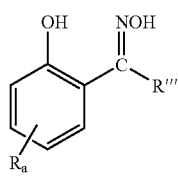

(II)

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25; and (b) an aldoxime of the formula III

(III)

in which R is as defined above with respect to Formulas I and II, c has a value of 1, 2, 3 or 4 and the total number of carbon atoms in $R_c$ is from 3 to 25.

More specifically, the hydroxy aryl oxime in the concentrate is selected from the group consisting of:

(a) a 2-hydroxy-5-nonyl acetophenone oxime in a concentration of oxime in the hydrocarbon solvent of from 55 to 85% by weight of the total concentrate;

(b) a 2-hydroxy-5-nonyl benzaldoxime in a concentration by weight of oxime in the hydrocarbon solvent of from 55 to 85% by weight of the total concentrate;

(c) a 2-hydroxy-5-dodecyl benzaldoxime in a concentration of oxime in the hydrocarbon solvent of from 61 to about 85% by weight of the total concentrate; and (d) a mixture of (a) with (b) or (c), or (b) and (c), in a concentration of oxime in the hydrocarbon solvent in a weight ratio of ketoxime to aldoxime of 1:100 to 100:1.

The hydroxy aryl oximes which are employed in the present invention, either ketoxime or aldoxime, are described in detail in U.S. Pat. Nos. 4,507,268 and 4,504,532, the entire disclosures of which are hereby incorporated by reference. These patents describe the preparation of both hydroxy aryl ketoximes and aldoximes by reference to other citations.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R'''' is methyl and R and a are as designated as being preferred for compounds of Formula I.

Compounds of Formula I wherein n has a value of 0 (i.e., hydroxy benzophenone oxime compounds) may suitably be prepared according to the methods disclosed in Swanson U.S. Pat. Nos. 3,592,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxy group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxy phenyl benzyl ketone oxime compounds) may suitably be prepared according to the methods disclosed in Anderson U.S. Pat. No. 4,029,704. Preferred phenyl benzyl ketone oximes, like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxy phenyl alkyl ketone oxime compounds) may suitably be prepared according to the procedures disclosed in U.K. Pat. No. 1,322,532. As noted with regard to benzophenone oxime and phenyl benzyl ketone oxime compounds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley et al., U.S. Pat. No. 4,020,105, or Ackerley et al., U.S. Pat. No. 4,020,106, or by oximation of aldehydes prepared according to Beswick, U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Preferred kinetic additives include α-hydroxy oximes described in Swanson, U.S. Pat. No. 3,224,873, and α, β-dioximes described in Koenders et al., U.S. Pat. No. 4,173,616. Preferred equilibrium modifier chemicals include aliphatic alcohols such as tridecanol, alkyl phenols such as nonylphenol and organophosphorus compounds such as tributyl phosphate and esters such as 2,2,4-trimethyl-1,3 pentane diol diisobutyrate. A wide variety of essentially water-immiscible hydrocarbon solvents can be used in the preparation of the concentrates and the formulation of the extractant compositions for use in the solvent extraction process for extracting metal values from aqueous solutions containing the metal values. These include: aliphatic and aromatic hydrocarbons such as kerosenes, the equilibrium modifier, as well as benzene, toluene, xylene and the like. The choice of the said essentially water-immiscible liquid hydrocarbon solvent for particular commercial operations will depend on a number of factors: the design of the solvent extraction plant (i.e., mixer-settlers, Podbielniak extractors, etc.), the value of the metal being recovered, disposal of plant effluent, and the like. The process of the present invention finds particular use in the extraction recovery of copper from solutions containing iron and chloride. Essentially, all of the major plants in operation currently for the recovery of Cu use mixer-settlers, with relatively large organic inventories and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher, and solubilities in water of less than 0.1% by weight. These solvents are chemically inert and the costs thereof are currently within practical ranges, i.e., normally about one dollar (U.S.) per gallon. Representative commercially-available solvents are KERMAC™ 470B (an aliphatic kerosene available from Kerr-McGee—flash point 175° F.), CHEVRON™ Ion Exchange Solvent (available from Standard Oil of California—flash point 195° F.), ESCAID™ 100 and 110 (available from Exxon-Europe—flash point 180° F.), EXXSOL™ D 80 available from Exxon-U.S.A. corresponds to Escaid 110, NORPAR™ 12 (available from Exxon-U.S.A.—flash point 160° F.), CONOCO™ C-1214 available from Conoco—flash point 160° F.), Aromatic 150 (an aromatic kerosene available from Exxon-U.S.A.—flash point 150° F.), and various other kerosenes and petroleum fraction available from other oil companies.

The invention may be illustrated further by means of the following examples.

EXAMPLE 1

Extensive testing and research was conducted to determine if preparing concentrates at much higher active solids than 48 to 61% by weight in a hydrocarbon solvent, i.e. kerosene, was possible, while maintaining the logistic and health hazard integrity of the products. The tests consisted of viscosity testing of the oxime compounds and mixtures thereof over a wide range of concentrations in kerosene solvents and over a wide range of temperatures to provide engineering profiles for pumping and pouring the solutions, as well as extensive thermal decomposition testing over the same ranges of concentrate solutions, by Accelerating Rate Calorimetry (ARC) tests, (as found in example 2 which follows herein), to determine the safe limits for storage at concentrations and at certain volumes of concentrate. It was determined that at 80% by weight concentration, all of known and commercially-used hydroxyaryl oxime, ketoximes and aldoximes such as 2-hydroxy-5-nonyl acetophenone oxime and 5-nonyl salicylaldoxime remain pourable and pumpable from their containers and the autocatalytic decomposition properties are diminished to the point where transport and storage in large containers is still feasible under ambient conditions, as used herein, from 10 to 120° F.

It also appeared that it may be possible to formulate the oximes up to 85% solids, particularly where ambient conditions are neither too warm (less than 100° F.) nor too cold (greater than 40° F.).

The extensive testing established that the preparation or formulation of concentrated forms of the ketoximes and the aldoximes, either individually, or as mixtures with each other, in ranges up to about 85% by weight in kerosene, as earlier described, remain pourable and pumpable and remain stable for extended periods at temperatures from about 10 to 120° F. without extensive thermal decomposition, thereby maintaining the logistical and health hazard integrity of the concentrates.

The viscosities of the ketoxime and aldoxime in a kerosene, SHELLSOL™ D 70 can be seen from the following Table I.

TABLE I

Below are viscosities in kerosene measured in centipoises (CPS) on a Brookfield DVII Digital Viscometer.

| 0% Shellsol D 70 | | 10% Shellsol D 70 | | 15% Shellsol D 70 | | 20% Shellsol D 70 | |
| --- | --- | --- | --- | --- | --- | --- | --- |
| Temp. °C | Viscosity CPS | Temp. °C | Viscosity CPS | Temp. °C | Viscosity CPS | Temp. °C | Viscosity CPS |
| KETOXIME (2-HYDROXY-5-NONYLACETOPHENONE OXIME) IN SHELLSOL D 70: | | | | | | | |
| 33 | $2.95 \times 10^3$ | 14 | $2.45 \times 10^3$ | 15 | $1.36 \times 10^3$ | 11 | 610 |
| 42 | 635 | 25 | $1.19 \times 10^3$ | 20 | 975 | 28 | 172 |
| 58 | 151 | 40 | 254 | 26 | 534 | 41 | 68 |
| 66 | 90 | 50 | 87 | 35 | 234 | 50 | 38 |
| 70 | 70 | | | 45 | 81 | | |
| | | | | 50 | 67 | | |
| ALDOXIME (5-NONYL SALICYLALDOXIME) IN SHELLSOL D 70: | | | | | | | |
| 20 | $7.0 \times 10^4$ | 10 | $12.5 \times 10^3$ | 15 | $3.5 \times 10^3$ | 11 | 1090 |
| 33 | $1.9 \times 10^4$ | 27 | $2.02 \times 10^3$ | 20 | $1.7 \times 10^3$ | 27 | 361 |
| 39 | $2.0 \times 10^3$ | 37 | 525 | 25 | $1.6 \times 10^3$ | 38 | 138 |
| 48 | 530 | 48 | 227 | 36 | 484 | 46 | 70 |
| 56 | 244 | | | 43 | 245 | | |
| | | | | 48 | 133 | | |

Three samples of concentrates were evaluated for maximum copper loading at concentrations of 10% v/v in kerosene. The results can be seen from the following Table II.

TABLE II

| | Copper Loading |
| --- | --- |
| Ketoxime | 7.12 g/l. |

TABLE II-continued

| | Copper Loading |
|---|---|
| C-9 Aldoxime | 8.25 g/l. |
| C-12 Aldoxime | 7.32 g/l. |

After preparing and providing the concentrate solutions as noted above, these concentrates are useful in preparing and formulating extractant reagent formulations for use in the solvent extraction process for the recovery of metals from aqueous solutions containing the metal values by mixing the concentrates in predetermined relative ratios to provide for the optimum metal loading of the reagents. As described in U.S. Pat. Nos. 4,507,368 and 4,544,532 noted earlier, mixtures of hydroxy aryl ketoximes and hydroxy aryl aldoximes, are preferred for extractant reagent compositions. Thus the concentrate of the ketoxime, such as the 2-hydroxy-5-nonyl acetophenone oxime is mixed with the concentrate of 5-nonyl or the 5-dodecyl salicylaldoxime in a predetermined ratio of aldoxime and ketoxime determined to provide the desired optimum extraction properties for the metal under consideration from the particular aqueous solution containing the metals values. Thus the mixture of aldoxime and ketoxime can be formulated so as to provide a ratio by weight of 1 part aldoxime to 100 parts ketoxime or conversely 1 part of ketoxime to 100 parts of aldoxime dependent on the performance specifications desired for the particular extraction solvent process under consideration.

The use of the concentrates permits the formulation of the extraction reagent composition at any level of 1% increments by weight of aldoxime and ketoxime as desired. Preferably, as indicated in U.S. Pat. No. 4,544,532, a 1:1 molar ratio of aldoxime at ketoxime is however preferred.

While it is preferred to mix the two concentrates in the desired ratio and then add additional diluent to the mixture in the formulation of the extraction system organic phase, the reagent composition may be formulated by first diluting one of the concentrates with added hydrocarbon diluent and then adding the second concentrate to the first diluted concentrate.

The present invention provides several advantages. For mixtures of the oximes or individual components, it provides for:

(a) less volume of material to be handled in the manufacturing plant and at the customer's site;

(b) savings in freight and container costs per copper loading unit of product;

(c) effectively larger on-site inventories thereby providing more security within the confines of existing warehouses and/or bulk storage facilities; and (d) allowing safer handling of these products, especially in larger volumes and at higher temperatures;

(e) other advantages which may be seen from the description of the invention, include the ability of the end user to more quickly adjust the ratio of mixed oximes in an operating solvent extraction circuit and an in-situ manner.

These benefits accrue in cost savings, operator-time savings, improved efficiency and increased supply security while maintaining safety and logistical integrity.

Thus the concentrates of either aldoxime or ketoxime alone, or mixtures of aldoxime and ketoxime, may be shipped to the site where they are to be employed in an extraction system which comprises (i) contacting an aqueous solution containing the metal values to be extracted with a metal extractant reagent dissolved in a water-immiscible hydrocarbon solvent thereby providing an organic extractant phase separable from the aqueous solution; and (ii) separating the organic extractant phase from the aqueous solution;

wherein the concentrate, whether ketoxime, aldoxime or mixture of both are added to the organic extractant phase having an oxime extractant concentration adjusted to provide for optimum extraction and recovery of the metal from the aqueous solution containing the metal values. The oxime concentration in the organic extractant phase is adjusted to about 0.05 to about 0.7 molar solution.

At the site, the concentrate can be added to the organic phase of the extraction system, with or without added hydrocarbon solvent and, optionally, with added equilibrium modifier or kinetic additive.

EXAMPLE 2

This example will serve to illustrate the consideration of the autocatalytic decomposition problem regarding the concentrates of hydroxyl aryl oxime extractant reagent compositions for shipment to customers who then dilute these reagents in a hydrocarbon diluent for use in metal extraction processes. It has been found that hydroxyl aryl oxime extractant molecules spontaneously undergo an autocatalytic decomposition reaction, which is exothermic. Since the rate of a chemical reaction is dependent on temperature, and the degradation reaction generates heat, there is the potential for loss of control of the degradation reaction. It is very important that the product be delivered to the customer in a concentration range and in a vessel size such that the customer does not need to apply heat to remove the product from the delivery vessel while at the same time it is also important that the product be delivered to the customer in an efficient and safe manner. For example, delivery in a small size vessel such as a drum presents less problems with respect to the control of the autocatalytic degradation reaction; however, pouring reagent from a drum presents handling problems for the worker, and the worker has a greater chance of exposure to the product. Thus there is a need to deliver these concentrated reagents in larger vessels than drums—for example, 1 cubic meter individual bulk containers (LIBC's) or 20 cubic meter isotainers, since these vessels allow the reagents to be handled in a safer more efficient manner with minimum worker exposure to the product.

Accordingly, in the investigation of the preparation of concentrates of hydroxyl aryl oxime extraction reagent concentrates for shipment to customers in large size containers where the reagent would be pourable, flowable and remain stable to uncontrolled autocatalytic degradation, Accelerating Rate Calorimetry (ARC) studies were carried out on differing formulations of 5-nonylsalicylaldoxime, 5-dodecylsalicylaldoxime and 2-hydroxy-5-nonylacetophenone oxime. The results were extremely enlightening and surprising. The results of the studies showed that in terms of hazard there is a relationship between the total volume of the product in a container, the viscosity of the product which is concentration related, and the temperature at which the product can be held and be safe from uncontrolled autocatalytic degradation.

To better understand the impact of these factors on the overall situation, the following illustration or model can be considered. Picture a container having the dimensions of 1 meter×1 meter×1 meter full of a material such as one of the invention's concentrates. Picture degradation beginning to occur in a volume the size of a golf ball in the center of the container. As degradation occurs, the temperature of the material in the golf ball will begin to increase, thus speeding up the degradation reaction. There will also be an increase in the level of degradation products in the golf ball, which will further catalyze degradation increasing the rate at which it occurs. The only potential to control the degradation reaction is to cool the material in the golf ball at the center of the container. Heat transfer will occur by two mechanisms: conduction to the surface where it can be radiated away and by convection which will result in mixing of the material with surrounding material. Convection involves mixing by thermal eddy currents which develop in the liquid. The effectiveness of the eddy currents in distributing the heat will be determined by the viscosity of the material. At higher viscosities, it is difficult for eddy currents to form. This leaves only conduction which is not a particularly effective means of heat transfer through a material such as the concentrates of this invention. The surrounding material tends to act as an insulator. As a general rule, heat generated in a smaller container such as a drum will have a shorter distance to travel through the surrounding material to reach the surface of the container where radiation can occur, as compared to a larger container such as a 1 cubic meter container. Once the heat reaches the surface of the container it can be radiated away to the surroundings. The effectiveness of radiation is highly dependent on the available surface area. The more surface area that is available, the more heat that can be radiated out into the surroundings. Considering standard container sizes, a 200 liter drum container will have a higher surface-to-volume ratio than will a 1 cubic meter LIBC, which, in turn, will have a higher surface-to-volume ratio than a 20 cubic meter isotainer. Heat generated at the center of a drum full of material will have less distance to travel to a surface and have more available surface area from which to be radiated than will heat generated at the center of an LIBC. To avoid uncontrolled degradation, one has to remove as much heat from the material as is being generated by the exothermic degradation reaction. If one does not, the temperature in the container will rise, causing the decomposition rate to increase—a classic chain reaction. It will quickly reach a rate at which one can not apply sufficient cooling to avoid total loss of control.

The interplay of viscosity and volume may be illustrated by the following results (Table III) derived from the ARC testing noted earlier. The Tnr is defined as the temperature of no return. Once the material reaches that temperature, in the given container size, there is no way for one to prevent a total "run-away" reaction. Two cases are considered in the data: (a) Low Viscosity-low viscosity fluid, insulated vessel, unstirred (heat transfer by both convection and conduction) and (b) High Viscosity-high viscosity fluid, insulated vessel, unstirred (heat transfer predominantly by conduction).

TABLE III

Tnr in degrees Centigrade for a Low Viscosity (LV) and a High Viscosity (HV) formulation.

| Container Volume (m³) | REAGENTS | | | | | |
|---|---|---|---|---|---|---|
| | Nonyl aldoxime | | Dodecyl aldoxime | | Nonyl ketoxime | |
| | LV | HV | LV | HV | LV | HV |
| 0.1 | 140 | 120 | 167 | 150 | 180 | 158 |
| 1.0 | 132 | 108 | 160 | 139 | 170 | 142 |
| 5.0 |  | 96 |  | 130 |  | 131 |
| 10 | 124 | 91 | 154 | 127 | 162 | 125 |
| 20 |  | 88 |  | 123 |  | 121 |
| 100 | 115 | 80 | 147 | 116 | 153 | 112 |
| 300 |  | 78 |  | 114 |  | 110 |

The results of this comparison show clearly the effect of viscosity and volume size. As you increase the volume size, the lower the Tnr becomes in all cases. Similarly, as you increase the viscosity, the lower the Tnr becomes in all cases for a given volume. None of this was recognized by those skilled in the art prior to the Applicant's invention described herein.

These observations play a critical role in determining what type of concentrate to provide the customer and in what volume. From a safety aspect, it has to be sufficiently pumpable or flowable to ensure complete emptying of the container so that the customer does not have to heat the container to remove its contents. They also provide the valuable unexpected insight into what volume of material can be safely stored long term. By giving consideration to the accelerating rate calorimetry testing, one can define ranges of oxime concentration and volume whereby the concentrate will be stable.

What is claimed:

1. A stable, flowable, pourable and pumpable concentrate of a hydroxy aryl oxime metal extractant in a water-immiscible hydrocarbon solution wherein the hydroxy aryl oxime metal extractant therein is present in an oxime concentration of about 55–85% by weight and is confined in a single container having a volume of from about 250 liters up to about 50,000 liters, and thereby maintaining the temperature within the container in an acceptable range as defined by accelerating rate calorimetry.

2. A concentrate as defined in claim 1 wherein the hydroxy aryl oxime metal extractant in the hydrocarbon solvent has an oxime concentration of from 62% to about 85% by weight.

3. A concentrate as defined in claim 1 wherein the hydroxyl aryl oxime is selected from the group consisting of:

(a) a ketoxime of the formula I or II

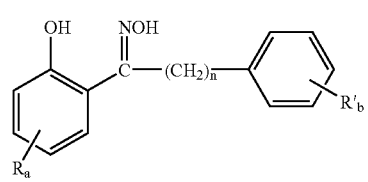

(I)

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

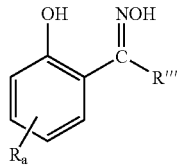

(II)

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25, and (b) an aldoxime of the formula III

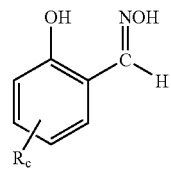

(III)

in which R is as defined above with respect to Formulas I and II, c has a value of 1, 2, 3 or 4, and the total number of carbon atoms in $R_c$ is from 3 to 25.

4. A concentrate as defined in claim 1, wherein the hydroxy aryl oxime metal extractant is selected from the group:
   (a) a 2-hydroxy-5-nonyl acetophenone oxime in a concentration of oxime in the hydrocarbon solvent of from 55 to 85% by weight of the total concentrate;
   (b) a 2-hydroxy-5-nonyl benzaldoxime in a concentration by weight of oxime in the hydrocarbon solvent of from 55 to 85% by weight of the total concentrate;
   (c) a 2-hydroxy-5-dodecyl benzaldoxime in a concentration of oxime in the hydrocarbon solvent of from 62 to about 85% by weight of the total concentrate; and
   (d) a mixture of (a) with (b) or (c), or (b) and (c), in a concentration of oxime in the hydrocarbon solvent in a weight ratio of ketoxime to aldoxime of 1:100 to 100:1.

5. A stable, flowable pourable and pumpable concentrate as defined in claim 1 wherein the water immiscible hydrocarbon solvent is an equilibrium modifier.

6. A process of preparing a stable, flowable, pourable, and pumpable concentrate of a hydroxyl aryl oxime metal extractant in a water-immiscible hydrocarbon solution comprising formulating the hydroxy aryl oxime metal extractant at an oxime concentration of about 55–85% by weight, and confining said concentrate in a single container having a volume of from about 250 liters up to about 50,000 liters thereby maintaining the temperature within the container in an acceptable range as defined by accelerating rate calorimetry.

7. A process as defined in claim 1 wherein the oxime concentration in the hydrocarbon solvent is from about 62% to about 85% by weight.

8. A process as defined in claim 1 wherein said hydroxyl aryl oxime is selected from the group consisting of:

(a) a ketoxime of the formula I or II

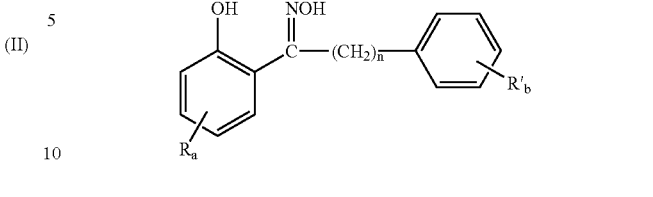

(I)

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

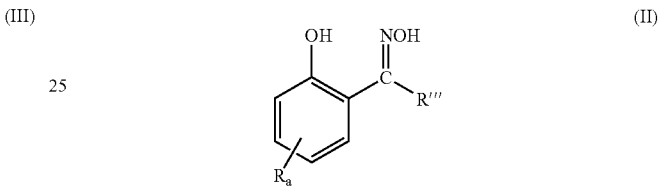

(II)

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25, and (b) an aldoxime of the formula III

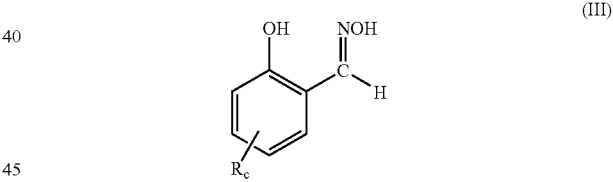

(III)

in which R is as defined above with respect to Formulas I and II, c has a value of 1, 2, 3 or 4, and the total number of carbon atoms in $R_c$ is from 3 to 25.

9. A process as defined in claim 1 wherein said hydroxyl aryl oxime is selected from the group consisting of:
   (a) a 2-hydroxy-5-nonyl acetophenone oxime in a concentration of oxime in the hydrocarbon solvent of from 55 to 85% by weight of the total concentrate;
   (b) a 2-hydroxy-5-nonyl benzaldoxime in a concentration by weight of oxime in the hydrocarbon solvent of from 55 to 85% by weight of the total concentrate;
   (c) a 2-hydroxy-5-dodecyl benzaldoxime in a concentration of oxime in the hydrocarbon solvent of from 62 to about 85% by weight of the total concentrate
   (d) a mixture of (a) with (b) or (c), or (b) and (c), in a concentration of oxime in the hydrocarbon solvent in a weight ratio of ketoxime to aldoxime of 1:100 to 100:1.

* * * * *